(No Model.)
R. S. ANDERSON.
PNEUMATIC TIRE FOR BICYCLES.
No. 535,342. Patented Mar. 12, 1895.
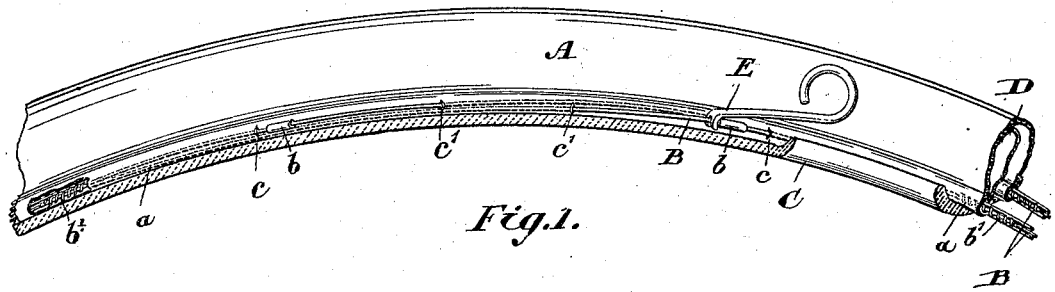
Fig. 1.
Fig. 2.
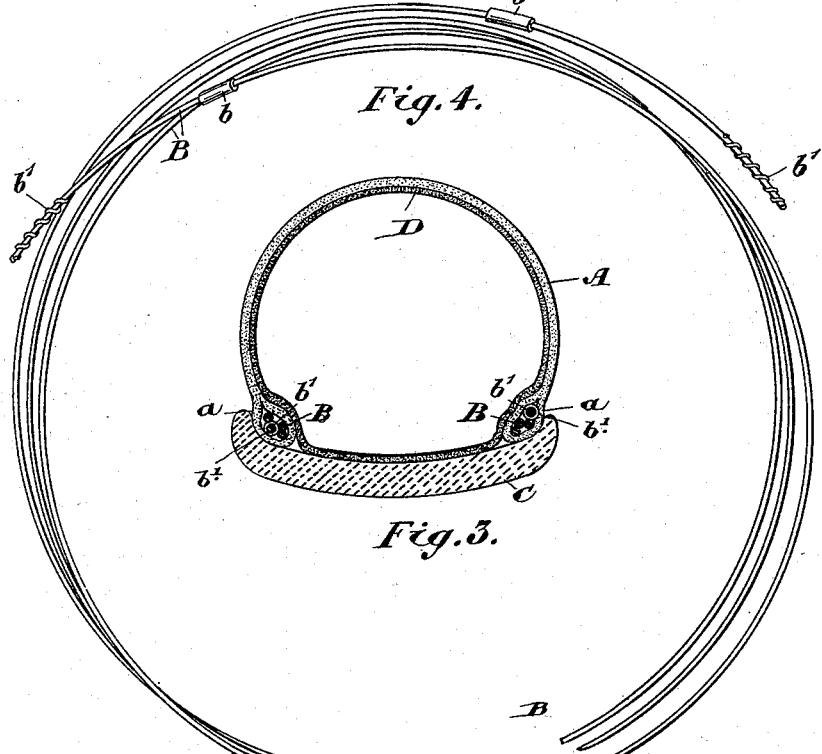
Fig. 4.
Fig. 3.
Witnesses.
E. R. Case
J. S. Beattie
Inventor.
Robert S. Anderson
by Fehrstenhaugh &Co
Attys

UNITED STATES PATENT OFFICE.

ROBERT S. ANDERSON, OF TORONTO, CANADA.

PNEUMATIC TIRE FOR BICYCLES.

SPECIFICATION forming part of Letters Patent No. 535,342, dated March 12, 1895.

Application filed November 28, 1894. Serial No. 530,284. (No model.)

*To all whom it may concern:*

Be it known that I, ROBERT SCOTT ANDERSON, of the city of Toronto, in the county of York, in the Province of Ontario, Canada, have invented certain new and useful Improvements in Pneumatic Tires for Bicycles and Wheels, of which the following is a specification.

My invention relates to improvements in pneumatic tires for bicycles and wheels patented to me in the United States of America on the 17th day of July, 1894, under No. 523,031, and the object of the invention is to devise a simple and perfect means whereby the ends of the convolutions may be readily adjusted in order to enable the tire to be placed upon or withdrawn from the rim and securely held in position when on the rim by the inflation of the tube without the necessity of withdrawing the ends of the convolutions of wire from within the edge of the tire and it consists essentially in bringing each end of the wire through a hole in the outer edge of the rim and preferably back again into the edge through another hole thereby leaving portion of each end of the wire outside the edge, the portion remaining outside being provided with an enlarged portion or pulling sleeve and the ends within the edge being provided with a corrugated or roughened end to grip into the edge when the tube is inflated as hereinafter more particularly explained.

Figure 1, is a perspective view of portion of the tire and rim showing the parts particularly involved in my improvement. Fig. 2, is a view showing only one end of the convolution brought through the opening and back again into the edge of the rim and the other end simply brought through a hole and turned into hook form. Fig. 3, is a cross section through the rim, tire and tube showing the position of the convolutions of the wires. Fig. 4, is a detail of the coil showing the preferred construction of the end.

In the drawings like letters of reference indicate corresponding parts in each figure.

A, is the tire, which is made of any suitable material portion only of the same being shown.

$a$, are the tubular edges of the tire.

B, are the coils which consist of a plurality of convolutions and which are inclosed in the tubular edges, $a$.

C, is the rim, and D, the air tube.

Each end of each coil extends preferably through a hole, $c$, made in the tire preferably at the outside of the edge and then is inserted back again through a hole, $c'$, into the edge. Between the holes, $c$, and, $c'$, upon the coil, B, I place a gripping sleeve $b$. This may be in the form shown in the drawings or in any other suitable form, which provides an enlarged portion whereby the forked hook, E, may be utilized in order to draw this end of the coil in either direction between the holes, $c$, and, $c'$, in order to tighten the tire on the rim. Each end of the coil, B, extends preferably along the outside of the edge at a short distance apart. At each extreme end, but not necessarily so, I provide a corrugated roughened or threaded end, $b'$. In the drawings I show this end as formed of wire spirally twisted around the end and soldered thereto but it will be understood that the end might be formed in many other ways, the object being to provide a perfect means for gripping into the rubber of the tubular edge when the tube is inflated and the pressure thereof exerted to press the edge upon the ends, $b'$. In my former patent I describe a tab not only for this purpose but for the purpose of pulling the ends of the wire in order to tighten the convolutions but as I now insert the ends back again into the edge I provide the ends $b'$, as described above in order that each end of the coil may be readily inserted and that they may effectually grip into the tubular edge when the air tube is inflated.

In Fig. 2, I show one end of the tube turned around into a hook, $c^2$, and passed through a hole in the inside edge. The other end, however, is passed on to the outside of the tubular edge and into it again as hereinbefore described. This latter form might be used and in such case the distances apart between the holes, $c$, and, $c'$, would be greater than in the form described in Fig. 1, but I prefer to use the two ends formed in the manner described in this figure.

By the form above described there is no danger of the ends of the wire getting out of place and I am also enabled to get at the wire to tighten the coil upon the rim without withdrawing the ends of the wires out of the tubular edges.

I find in practice by the form of ends made as above described that the tire will remain on the rim even when the tube is gradually being deflated by constant use and also to a certain extent if the tube is not inflated at all.

What I claim as my invention is—

1. In a pneumatic tire for bicycles and wheels the combination with the tire, tube and rim, of a wire coil consisting of a plurality of convolutions inclosed in each tubular edge of the tire and having one end secured in the edge and the other end passed from the interior to the exterior of said edge and back to the interior through holes in the fabric of said tire and provided with means at such end for gripping into the tubular edge when the tube is inflated as and for the purpose specified.

2. In a pneumatic tire for bicycles and wheels the combination with the tire, tube and rim, of a wire coil consisting of a plurality of convolutions inclosed in each tubular edge of the tire and having one end secured in the edge and the other end passed from the interior to the exterior of said edge and back to the interior through holes in the fabric of said tire and a spirally formed end to grip into the edge when the tube is inflated as and for the purpose specified.

3. In a pneumatic tire for bicycles and wheels, the combination with the tire, tube and rim, of a wire coil consisting of a plurality of convolutions inclosed in each tubular edge of the tire and having one end secured in the edge and the other end passed from the interior to the exterior of said edge and back to the interior through holes in the fabric of said tire and a gripping sleeve designed to form a means of pulling or slackening the wire between the holes in the outside of the tubular edge as and for the purpose specified.

4. In a pneumatic tire for bicycles and wheels the combination with the tire, tube and rim, of a wire coil consisting of a plurality of convolutions inclosed in each tubular edge of the tire and having each end extending through a hole to the outside of the edge between it and the rim and inserted again into the tire, a portion, $b'$, provided on the coil to grip into the edge when the tube is inflated and a gripping sleeve, $b$, provided on the ends of the coil between the holes to the outside of the edge to provide means for adjustment as and for the purpose specified.

ROBERT S. ANDERSON.

Witnesses:
B. BOYD,
E. R. CASE.